(12) United States Patent
Dildy (10) Patent No.: US 6,263,311 B1
(45) Date of Patent: Jul. 17, 2001

(54) METHOD AND SYSTEM FOR PROVIDING SECURITY USING VOICE RECOGNITION

(75) Inventor: Robert Dildy, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/228,475

(22) Filed: Jan. 11, 1999

(51) Int. Cl.[7] ...................................................... F10L 15/00
(52) U.S. Cl. ............................................ 704/273; 704/247
(58) Field of Search .................................... 704/270, 275, 704/273, 272, 246, 247, 250, 252, 231, 236, 200

(56) References Cited

U.S. PATENT DOCUMENTS 4,590,604 * 5/1986 Feilchenfeld .......................... 704/272
4,998,279 * 3/1991 Weiss .

* cited by examiner

Primary Examiner—Richemond Dorvil
(74) Attorney, Agent, or Firm—Conley, Rose & Tayon PC; Jeffrey C. Hood (57) ABSTRACT

Method and system for providing security to a space by detecting an unauthorized presence in the space using voice recognition. A plurality of acceptable voice patterns is generated from sounds of authorized users and stored in the security system. Sounds in the space to be protected are detected and a current voice pattern is generated from at least one sound detected in the space to be protected. The current voice pattern is compared with entries in the stored voice lists to determine a level of difference or a level of similarity between the current voice pattern and the content of the voice list. If the determined level constitutes a discrepancy according to predetermined criteria, an alarm response is initiated. Further, if the determined level constitutes a matching between the current voice pattern and an entry in an emergency list of voice codes that were entered by authorized users, a predetermined emergency action is performed. The advantages of the voice recognition as a security measure may be also integrated into existing security systems.

16 Claims, 5 Drawing Sheets

METHOD AND SYSTEM FOR PROVIDING SECURITY USING VOICE RECOGNITION

BACKGROUND OF THE INVENTION

1. Field of the Invention

The present invention relates generally to security systems and more particularly to security systems with voice recognition functions.

2. Description of the Relevant Art

The use of security systems to protect people and buildings has seen an increasing demand. The basic idea of a security system is sensing a predetermined parameter and delivering a response upon changes in the value of that parameter. The parameter(s) detected by the security system usually indicates the existence of an unacceptable condition, such as an open door which should be closed, the presence of an intruder, or a condition of an emergency nature (such as fire or flood). Security systems employ many types of sensors such as motion sensors for both the indoors and outdoors, glass-break detectors, magnetic contact sensors, flood detectors, temperature sensors, smoke detectors, sensitized door mats, etc. The use of specific sensors and security systems vary from person to person and from building to building based on the security needs and concerns.

Security systems have continuously become more complex as the employment of different technologies in security systems has substantially increased to combat security challenges. Many of today's security systems employ some software programming and hardware adjustments to provide control functions and automation, such as operating lights, appliances, thermostats, motorized drapes, phones, and other devices. A security system may be configured to send an emergency signal to a specific party, such as dialing a police or a physician upon detection of an emergency condition. The emergency condition is usually programmed or pre-entered in the security system. The initiation of an action (when emergency conditions exist) is either prompted by the user or automatically started by the security system.

To increase the functionality of security systems, so that they meet changing security needs, modem security systems may employ existing or dedicated phone lines and phone systems to deliver extended functionality. For example, a security system may be configured to initiate an intercom phone call upon detecting knocking on the door, whereby the user is able to converse with visitors before opening the door. Further, a security system's owner may call a security system from a remote location using a phone to change security setup or conditions. Although the owner accesses the security system by entering a password or a form of access information, an unauthorized user may be able to disarm the system or change the existing security criteria if he knows the access information, thus straying the value of the security system.

Many security systems utilize a telephone control module that converts touch-tone tones into control commands. Any command that is enacted by the security system may now be performed from the keypad of a touch-tone phone. For example, if a user forgets to arm the security system while leaving his house, the arming of the system may be performed by a few keys on the car phone. Therefore, developments in telephony and other technologies contribute to the sophistication of security systems, for example, using computer links, through serial port connections, to provide advantages of a processor or building security systems with their own processors.

As mentioned above, the integration between the security system and other technologies of home and office automation provides an extended functionality and complexity to security systems. Unfortunately, security systems are still vulnerable to unauthorized individuals. An unauthorized individual may reach the protected areas without detection by the security system. For example, an owner may admit an unauthorized individual into the protected area before realizing the mistake. An individual may reach the protected area by passing sensors without detection. An unauthorized individual may breach the security system with stolen access information. A security need may arise without prior identification of an unauthorized individual. Further, a security need may arise independent of the existence of an unauthorized individual. Therefore, reducing or eliminating the security systems vulnerability is desirable. Further, increasing the capability of the security systems to satisfy even better security needs is also desirable.

SUMMARY OF THE INVENTION

The present invention comprises method and system for detecting an unauthorized presence in a space (such as a room) to be protected, or subjected to security measures. The protection is provided by detecting the voice or sound of an intruder, or an unauthorized user, in the space that is subjected to the security measures. Further, the method and system provide additional security measures to the space to be protected by providing recognition to predetermined voice codes provided by authorized users. A voice list including a plurality of authorized voice patterns is generated and stored. When the system is activated, sensors in the space to be protected are employed to detect sounds in the space. The detected sound is indicative of a sound source in the protected space and the sound source is indicative of a presence (authorized or unauthorized) in the space to be protected. The detected sound is used to generate a current voice pattern indicative of the characteristics of the sound source. The generated current voice pattern is compared against the plurality of authorized voice patterns that were stored in the voice list. If the current voice pattern matches an entry in the voice list (based on predetermined criteria), then the detected sound indicates an authorize presence (such as a homeowner), otherwise the detected sound indicates an unauthorized presence (such as an intruder). If an unauthorized presence is detected, in the space to be protected, the system is configured to initiate an alarm response.

The method and system further comprise initiating an alarm response if the current voice pattern matches a special voice pattern (or voice code) of an authorized user in the space to be protected. Voice codes may be stored along with voice patterns in the voice list or may be stored in a separate emergency voice list that contains only voice codes. Upon a determination of a match between a generated voice pattern and a voice code, a predetermined special action is initiated by the system. Thus, an alarm response may be triggered based on the detection of a voice code (that is indicative of an emergency need) by an authorized user requesting an action (such as dialing 911) to be performed by the security system.

Broadly speaking, the present invention contemplates a method and system that advantageously improve the security of a space, to be protected, by providing detection and recognition to sounds generated in that space. The sound is detected by a sound sensor and processed in a voice recognition unit to generate a current voice pattern. The current voice pattern is compared with a plurality of authorized voice patterns that are stored in a voice list in the system. The authorized voice patterns reference the presence of authorized sounds in the space, such as those generated by authorized individuals. If the detected sound, upon processing in the voice-processing unit, indicates a presence of an unauthorized individual or an emergency request by an authorized user, the system is configured to initiate an alarm response that advantageously provides better security measures to the protected space and its users.

BRIEF DESCRIPTION OF THE DRAWINGS

Other objects and advantages of the present invention may become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Figure 1:
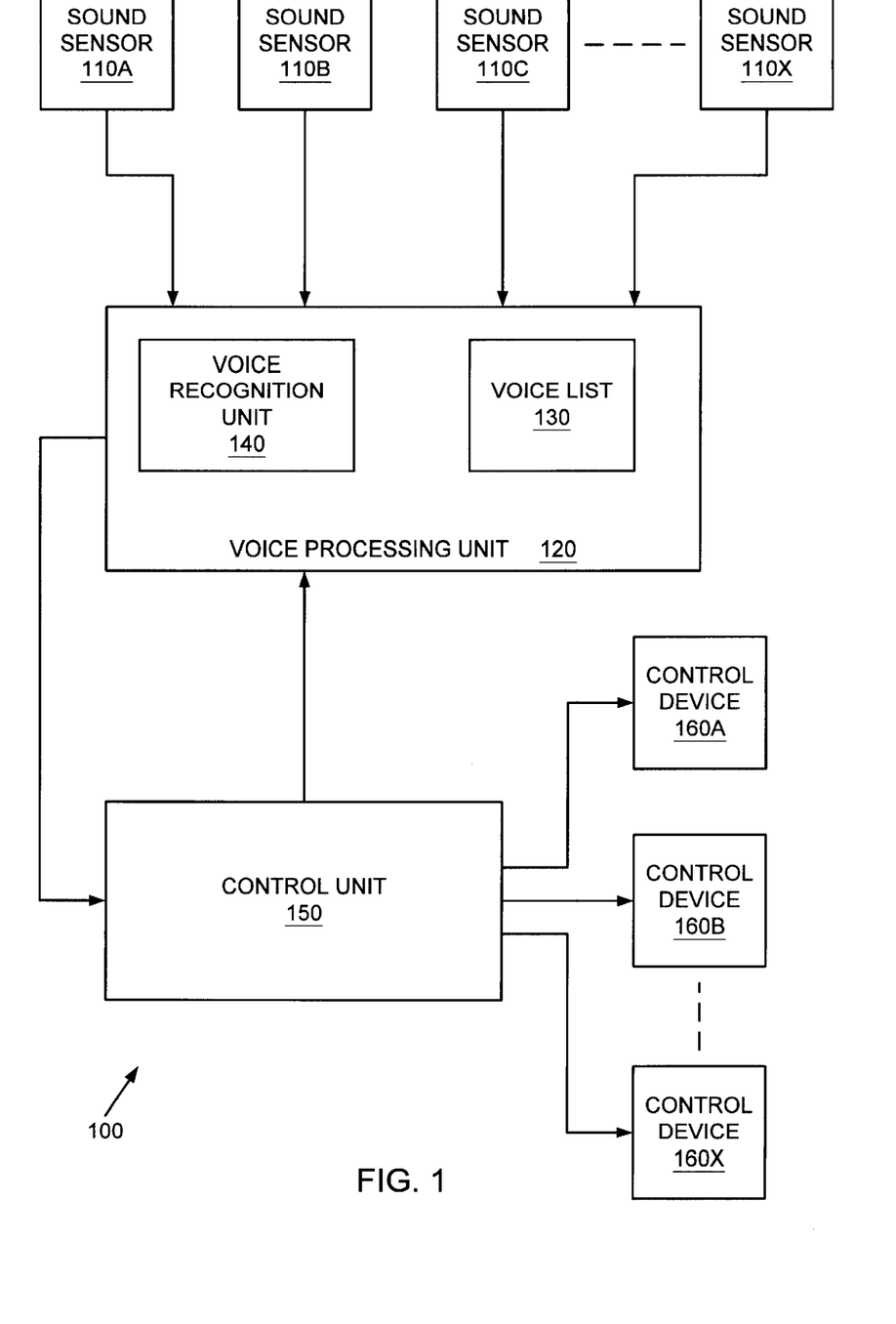
FIG. 1 is a block diagram of a security system that provides voice recognition functions and improves security by responding and recognizing sounds in the space to be protected.

Turning now to FIG. 1, a block diagram of a security system is shown that provides voice recognition and improves security by detecting an unauthorized presence in a space to be protected. In one embodiment, the security system 100 utilizes an X number of sound sensors 110A, 111B, 110C, . . . , 100X, to detect sounds generated in the space to be protected. The number of sensors used in system 100 depends on the size and type of the space to be protected, the security needs of the space, and the spectrum of sound frequencies to be covered in the security design of the space. In this description, the reference to a group of elements which share the same numeric (such as 110A, 111B, 110C, . . . , 110X) may be collectively indicated by referring to the numeric alone. For example, the numeric 110 is used to collectively reference sound sensors 111A, 110B, 110C, . . . , 110X. Sound sensors 110 may be transducers (or transmitters) that generate voltage (or current) signals in response to changes in acoustic waves received by the sensors. In one embodiment, sensors 110 are of the same type. They may be distributed in different locations in the space to be protected based on the space's security needs. In another embodiments, sensors 110 are of different types to provide a wide spectrum of sound detection capabilities appropriate to the space's security needs. Preferably; the number, type, and distribution of sensors 110 are selected to satisfy the security needs of the space to be protected.

In one embodiment, sensors 110 are coupled to a voice-processing unit 120. Signals generated by sensors 110 are transmitted to unit 120 for processing. The voice-processing unit 120 comprises a voice recognition unit 140 and a voice list 130. The voice recognition unit 140 may be any voice recognition unit that is suitable to the security needs of the space to be protected. The voice recognition unit 140 preferably comprises a processor, such as CPV or DSP, which executes voice recognition software from a memory. The voice list preferably comprises a random access memory. In one embodiment, the voice list 130 is included within the memory of the voice recognition unit 140. Alternatively, the voice list 130 may be included within the voice-processing unit 120 as an external element to the voice recognition unit 140. In the embodiment of FIG. 1, the voice list 130 is configured to store a plurality of voice patterns. Generally speaking, the voice patterns stored in the voice list 130 are "acceptable" or "authorized" voice patterns of recognized users. The acceptable voice patterns are those patterns of authorized individuals whom when they are present in the space to be protected do not constitute a security concern. For example, the voice list 130 stores sounds of an owner of the security system, sounds of other family members in the home, and may be sounds of other individuals who may be normally visiting the house such friends, cleaning personnel, and babysitters. The voice list 130 may further include non-human sounds such as pets in the house.

In one embodiment, the voice recognition unit 140 is employed to generate acceptable voice patterns from normal conversations of authorized users. A recording may be initiated, by an authorized user, to record sounds of authorized individuals during their conversations. The recorded conversations may be used to create voice patterns for the authorized individuals that are stored in the voice list 130. Alternatively, voice patterns may be generated by recording specific words and phrases pronounced by each of the authorized individuals. The generated voice patterns are stored in the voice list 130. Generally speaking, each voice pattern includes at least one word pronounced by an authorized user. The user is any human or non-human source of sound. Since the voice list 130 is developed from acceptable voice patterns, the availability of a sound, generated by a source in the space to be protected, that matches (based on predetermined criteria) at least one entry in the voice list 130 may be considered acceptable.

In one embodiment, the voice-processing unit 120 is configured to analyze at least one sound detected by one of the sound sensors 120 in the space to be protected. Analysis of the detected sound includes generating a current voice pattern. The current voice pattern is generated when one or more of the sensors 110 transmit at least one signal to the voice-processing unit 120. Therefore, the current voice pattern is indicative of the sound source in the space to be protected. Upon the generation of the current voice pattern, the voice-processing unit 120 compares the current voice pattern with the voice patterns stored in the voice list 130. The result of the comparison between the current voice pattern and the content of the voice list 130 indicates if the current voice pattern has correspondence (for example, similarity) with at least one of the voice patterns that were stored in the voice list 130. Accordingly, if the result of the above comparison indicates a current voice pattern that is not within an acceptable range of correspondence (according to predetermined criteria), an unacceptable voice pattern is detected.

Generally speaking, the detection of the unacceptable voice pattern by the voice-processing unit 120 indicates the existence of an unauthorized presence in the space to be protected. In one embodiment, the voice recognition unit 140 performs the generation and analysis of the current voice patterns. It is noted that many levels of voice-processing sophistication are known in the art. Any level of sophistication that is satisfactory to the needs of the security system may be implemented by the voice-processing unit 120. Therefore, the level of sophistication for the voice-processing functions of system 100 is dependent on the depth of the security needs in the space to be protected. The description of a specific sophistication is not intended to restrict the present invention, but rather it is presented as an example. Accordingly, any level of sophistication of voice-processing for system 100 is contemplated in the present invention.

In the embodiment of system 100, the voice-processing unit 120 is configured to assert at least one signal to control unit 150 when a discrepancy, between the current voice pattern and the content of the voice list 130, is detected. The discrepancy between the current voice pattern and the content of the voice list 130 may be obtained when the current voice pattern matches no entry in the voice list 130. Alternatively, a discrepancy may be also obtained based on a partial matching (instead of no matching) between the current voice pattern and the content of the voice list 130. The decision on the "size" of difference between the current voice pattern and the content of the voice list 130 that would constitute a discrepancy, between the current voice pattern and the content in the voice list 130, is dependent on the voice-processing unit 120 sophistication and the depth of the security needs in the space to be protected. Furthermore, two or more levels of sophistication may be utilized by the voice-processing unit 120. In the latter, the level of sophistication to be used in analyzing the detected sounds by sensors 110 is at least dependent on the nature of sound detected by one or more of the sensors 1 10.

A first level of sophistication for the voice-processing functions of system 100 may be employed to arrive into a discrepancy between a current voice pattern and the content of the voice list 130 based on a total mismatch. A second level of sophistication may be employed by the voice-processing unit 120 to arrive into a discrepancy based on a partial mismatch. For example, when a sound form an unauthorized individual is detected by the voice-processing unit 120, a discrepancy is obtained. As mentioned above, the decision when a discrepancy occur depends on the level of sophistication chosen for the voice-processing functions of the voice-processing unit 120, and the depth of the security measures needed in the space to be protected.

Control unit 150 is configured to control signal at least one of the control devices 160A, 160B, . . . , 160X, when a discrepancy (between the current voice pattern and the content of the voice list 130) is obtained by the voice-processing unit 120. The number of control devices 160 may vary depending on the "action" (or the alarm response) that the system 100 is designed for. Further, a control device 160 may be any device adapted to perform a function in response to a control signal received from the control unit 150. For example, a control device 160 may be an audio alarm, a visual alarm, an electrical door locker/opener, a power controller, a light controller, a phone system, a module to dial a number through the phone system, a display device . . . etc.

In one embodiment, the control unit 150 is configured to perform a sequence of actions upon one or more of the assertion signals received from the voice-processing unit 120. In another embodiment, the sequence of actions performed by the control unit 150 is dependent on a second group of assertion signals supplied by the voice-processing unit 120. In the latter, a second control action may be performed based on a second discrepancy determined by the voice-processing unit 120 after determining a first discrepancy. Further, a second control action may be performed based on the nature of the first control action. It will be appreciated by those skilled in the art that many combinations of the control devices 160 and configurations of the control unit 150 are possible. The above description is given as an example and is not intended to restrict the scope of the present innovation.

Figure 1A:
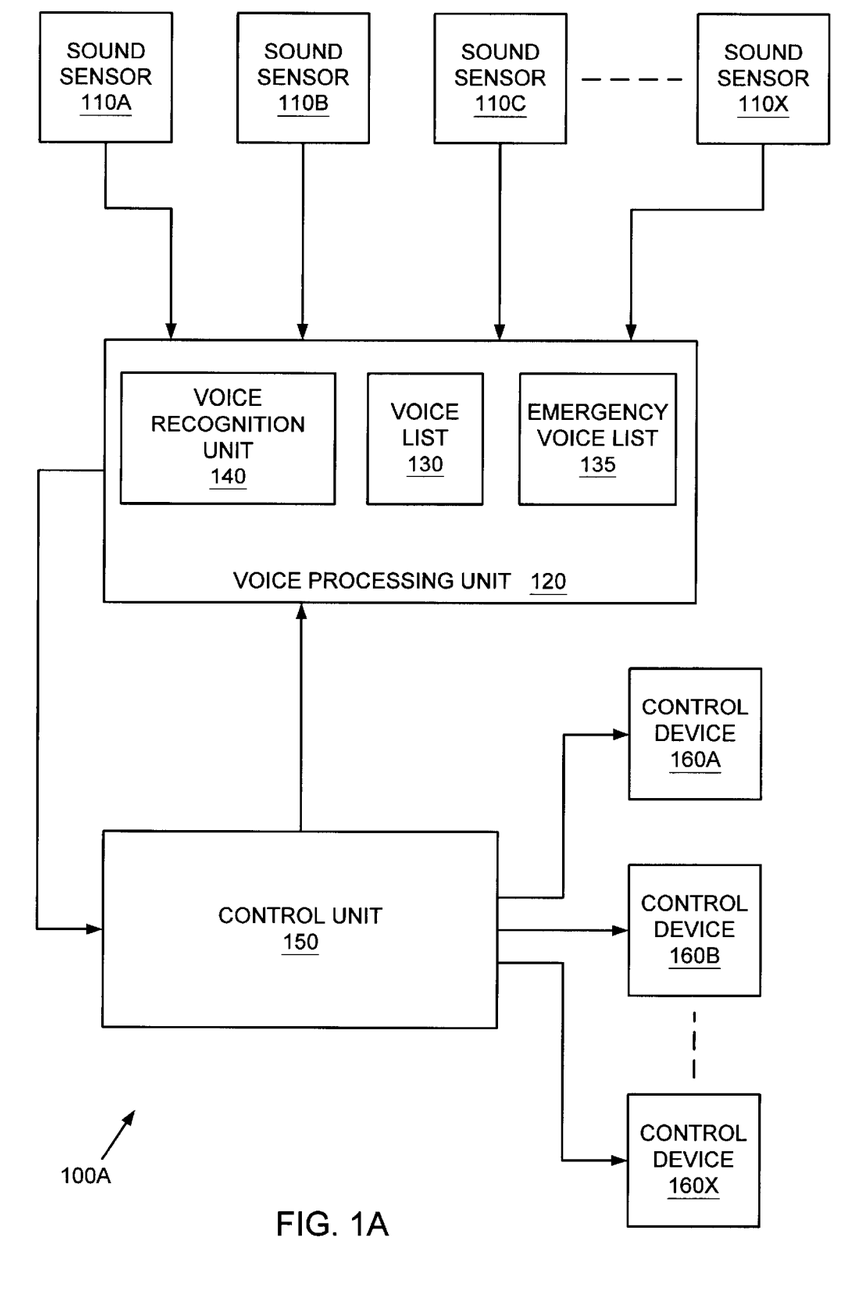
FIG. 1A is a block diagram of a security system that provides voice recognition and improves security by responding to sounds including voice codes by authorized users in the space to be protected.

Turning now to FIG. 1A, a block diagram of a security system that provides voice recognition and improves security by responding to a sound including an emergency voice list is shown. The security system 100A is similar to the embodiment of system 100, however, it includes an emergency voice list 135. The emergency voice list 135 is generated in a manner similar to that of the voice list 130 as described above. In this embodiment, the additional voice list 135 contains special voice codes (emergency voice patterns) of authorized users. The voice codes are specific patterns of voice that are entered by authorized users. The security system is configured to perform a specific alarm response when one or more of the voice codes are detected. Accordingly, when a current voice pattern is generated, the voice-processing unit 120 compares the current voice pattern with both contents of the voice list 130 and the emergency voice list 135. If the current voice pattern matches an entry in the emergency voice list 135, a predetermined alarm response is initiated. Therefore, the voice-processing unit 120 compares the current voice pattern with the content of the emergency voice list 135 looking for a matching rather than a discrepancy as in the case of the voice list 130.

As mentioned above, the voice codes (in the emergency voice list 135) may be used to signal the security system to perform a special function by announcing one or more of the voice codes. The users of the security system already know the response of the security system when one of the voice codes is announced. For example, a code "take me to haven" may be a voice code adapted to signal system 100A to initiate a phone call to the police. The advantage of incorporating the emergency voice list 135 is the ability to trigger the security system to perform a security function upon announcing one of the voice codes by an authorized individual. The latter case is specifically valuable when a circumstance arisen such that the authorized user is unable to perform a security function (for example, dialing 911) except by announcing a voice code. For example, an owner may initiate a 911 call while he is in company with other individuals without their knowledge or he may initiate the call while he is handicapped from reaching the phone due to an illness or accident. It should be noted that the level of full matching or partial matching required in performing the comparison between the current voice pattern and the content of the emergency voice list 135 is dependent on the level(s) of sophistication employed by the voice-processing unit 120 and on the depth of the security measures needed in the space to be protected.

Figure 2:
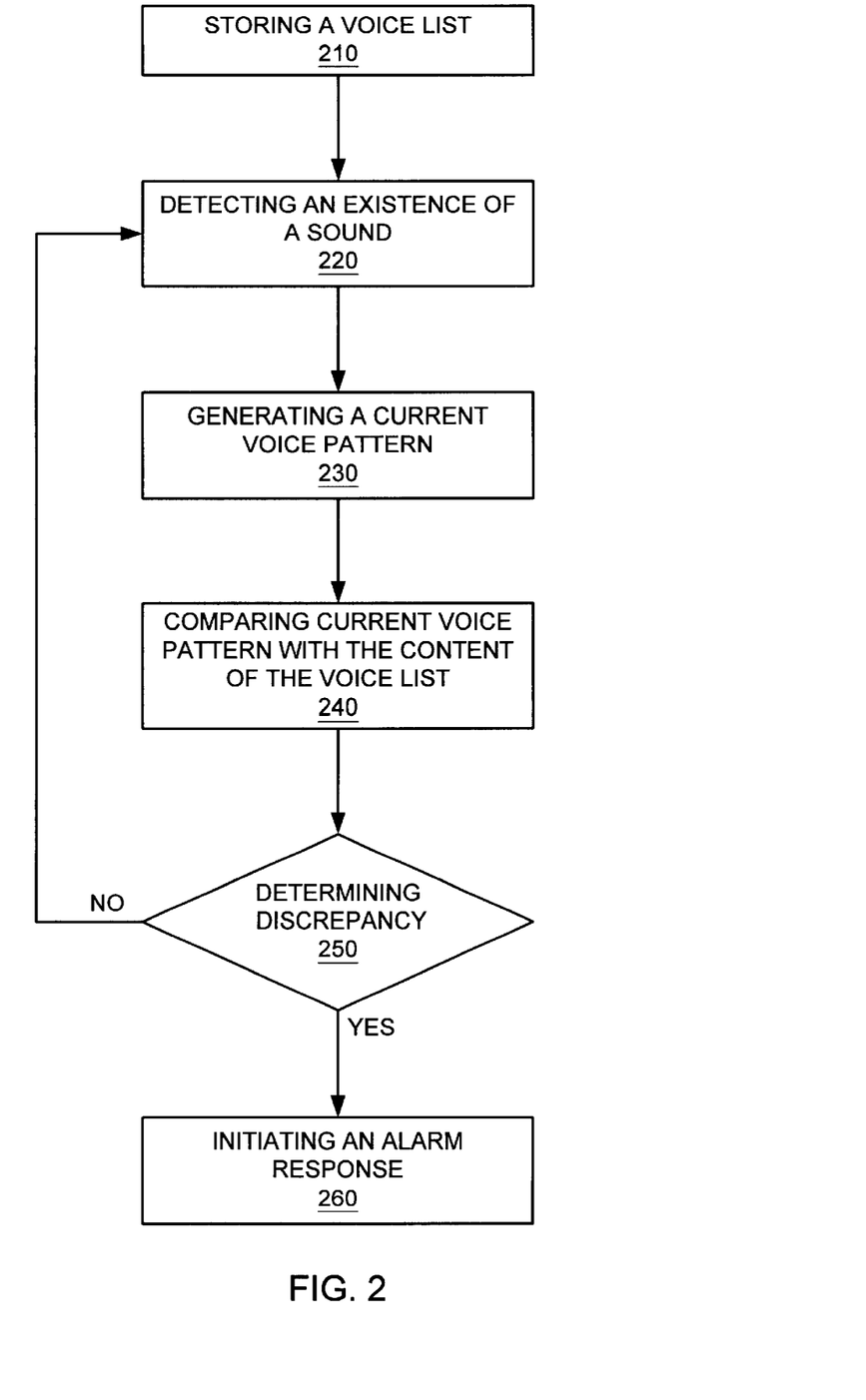
FIG. 2 is a flow chart of a method to provide security to a space using voice recognition.

Turning now to FIG. 2, a flow chart of a method to provide security to a space upon detection of a sound (using voice recognition) in the space under security is shown. In the embodiment of FIG. 2, storing of a voice list is performed in step 210. The voice list includes a plurality of voice patterns. Generally speaking, the voice patterns are "acceptable" voice patterns. The acceptable voice patterns are those which do not constitute a concern from a security standpoint. For example, the voice list that is stored in step 210 may include a sound of an owner of a house, sounds of other family members in the home, and sounds of other individuals who may be normally visiting the house such as friends, cleaning personals, and babysitters. Other sounds that may also be stored in the voice list are non-human sounds such as those of pets in the space to be protected.

In step 220, an existence of a sound in the space to be protected in detected. Detection of the sound may be achieved by any sound sensor or detector that is satisfactory to the security needs in the space to be protected. Upon detecting a sound (step 220), a current voice pattern is generated in step 230. The voice pattern may be a single sound or a combination of sounds. The current voice pattern generated in step 230 is analyzed with respect to the content of the voice list stored in step 210. In step 240 a comparison between the current voice pattern and the content of the voice list is performed. The analysis of the current voice pattern with the content of the voice list may be achieved by using one or more voice recognition techniques.

In step 250 a determination of a discrepancy between the current voice pattern and the content of the voice list is performed. If the result of step 250 indicates a discrepancy, one or more alarm responses are initiated in step 260. In one embodiment, the discrepancy that is determined in step 250 (between the current voice pattern generated in step 230 and the content of the voice list stored in step 210) is obtained when the current voice pattern matches no entry in the voice list. In another embodiment, the discrepancy may be determined based on a partial matching between the current voice pattern and the content of the voice list using predetermined criteria. The decision to be made in step 250 is generally based on the size of the difference between the current voice pattern and the content of the voice list. The size of the difference may be used to indicate an existence of a discrepancy between the current voice pattern and the content in the voice list stored in step 210. It should be noted that the determination of a discrepancy that leads to initiating an alarm response in step 260 is dependent on the predetermined criteria. The latter is also dependent on the level of sophistication employed by the security system and the security needs in the space to be protected. It should be also noted that any level of sophistication is contemplated by the present invention. Further, more than one level of sophistication may be utilized in at least step 240.

In one embodiment, the initiation of an alarm response in step 260 may include a number of actions designed to provide security measures. For example, the initiation of an alarm response in step 260 may include two or more security actions. Any of the actions may be initiated based on a level of discrepancy that is determined by step 250. Further, a sequence of alarm responses may be initiated in step 260 upon one or more discrepancy levels that are determined in step 250. It should be noted that the number of alarm responses is dependent on the security measures needed in the space to be protected. Further, the alarm response initiated in step 260 may also depend on both the sophistication of the comparison performed in step 240 and the security needs of the space to be protected. Generally speaking, an initiation of an alarm response in step 260 may result in the activation of one or more devices; such as audio alarms, visual alarms, electrical door lockers/openers, electric power controllers, light controllers, phone systems, controllers to dial phone numbers, display devices . . . etc.

Figure 2A:
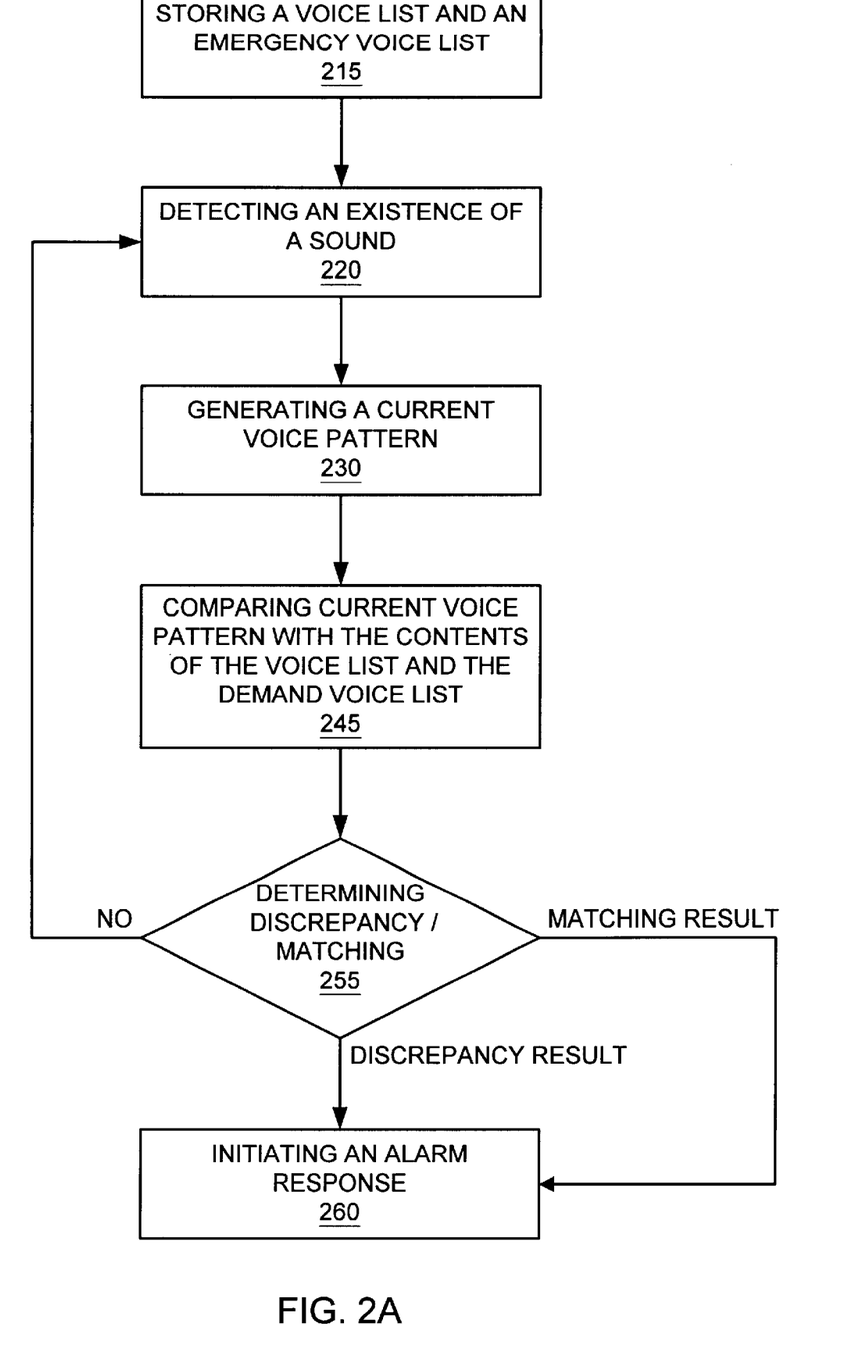
FIG. 2A is a flow chart of a method to provide security to a space using voice recognition including voice codes.

Turning now to FIG. 2A, a flow chart of a method to provide security to a space using voice recognition including an emergency voice list is shown. In the embodiment of FIG. 2A, an emergency voice list and a voice list are stored in step 215. Steps 220, 230, and 260 of FIG. 2A are the same as in FIG. 2 described earlier. The emergency voice list comprises of voice codes of authorized users of the space to be protected. The voice codes in the emergency voice list may be used to signal the security system to perform a special function. The users of the security system already know the response of the security system when one of the voice codes is announced. The advantage of incorporating the emergency voice list is the ability to trigger the security system to perform an emergency function (such as calling 911) by an authorized user, while the ability of the authorized user to initiate such action is restricted otherwise.

In step 245 a comparison between the current voice pattern and the contents of the voice list and the emergency voice list is performed. The analysis of the current voice pattern with the contents of the voice lists may be achieved by using one or more voice recognition techniques. In step 255 a determination of a discrepancy between the current voice pattern and the content of the voice list, or a matching between the current voice pattern and the content of the emergency voice list is performed. If a discrepancy (or a matching) exists according to predetermined criteria, one or more alarm responses are initiated in step 260. In one embodiment, a discrepancy is obtained when the current voice pattern matches no entry in the voice list. Further, a matching is obtained when the current voice pattern matches an entry in the emergency voice list. In another embodiment, the discrepancy may be determined in step 255 from a partial matching between the current voice pattern and the content of the voice list. Likewise, the matching may be determined in step 255 from a partial discrepancy between the current voice pattern and the content of the emergency voice list.

The decision to be made in step 255 is generally based on the size of either the difference or the similarity between the current voice pattern and the contents of the voice list and the emergency voice list, respectively. The size of the difference may be used to indicate an existence of a discrepancy between the current voice pattern and the content in the voice. Likewise, the size of the similarity may be used to indicate an existence of a matching between the current voice pattern and the content in the emergency voice list. It should be noted that the determination of a discrepancy, or a matching, that leads to initiating an alarm response in step 260 is depended on the level(s) of sophistication of voice-processing functions and the security needs in the space to be protected. It should be also noted that any level of sophistication is contemplated by the present invention. Further, more than one level of sophistication may be utilized in analyzing the current voice pattern and voice patterns stored in both the voice list and the emergency list at least in step 245.

In one embodiment, the initiation of an alarm response in step 260 may include a number of actions designed to provide security needs. One or more of the action levels may be initiated in step 260 based on a level of discrepancy or matching that was determined by step 255. Further, a sequence of alarm responses may be initiated in step 260 upon one or more discrepancy or matching levels determined by step 255. It should be noted that the number of alarm responses is dependent on the security measures needed in the space to be protected or on the voice codes. Further, the alarm response initiated in step 260 may also depend on both the sophistication of the comparison performed in step 245 and the security needs of the space to be protected.

Figure 3:
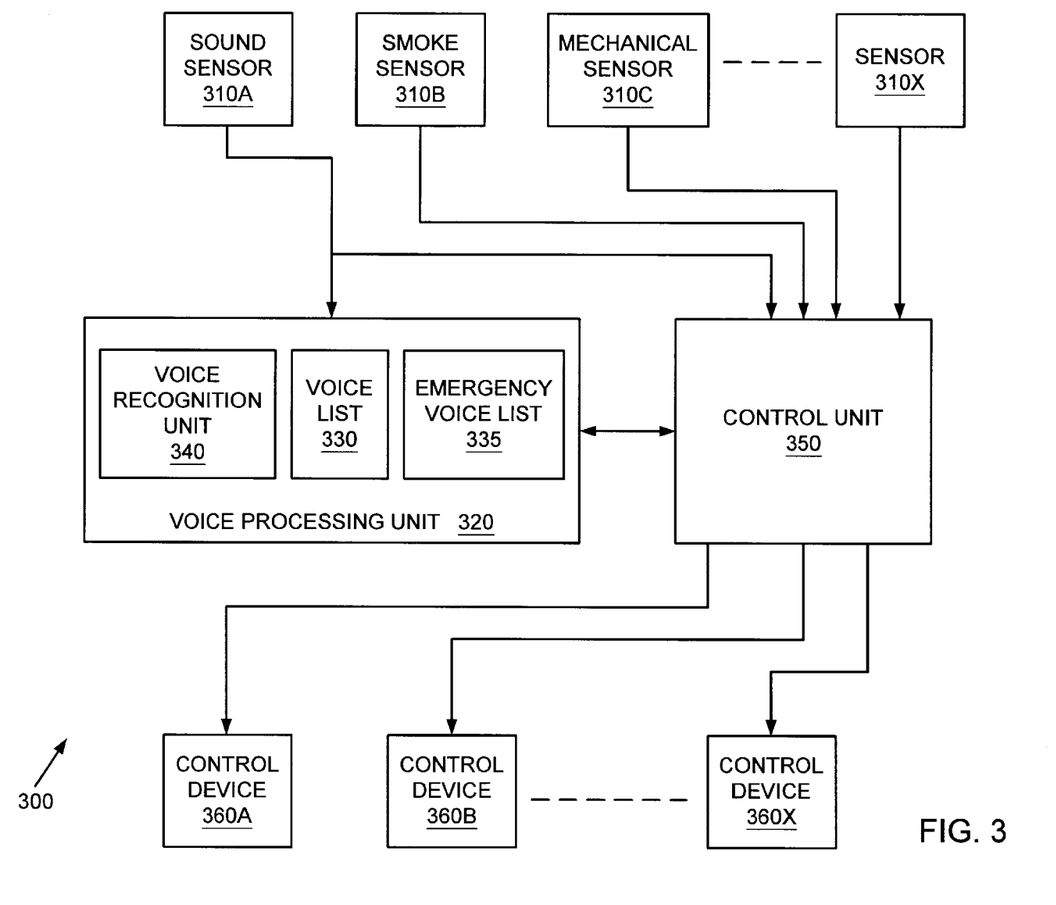
FIG. 3 is a block diagram of a security system incorporating a voice recognition system in addition to other security measures.

Turning now to FIG. 3, a block diagram of a security system 300 incorporating a voice recognition system is shown. In one embodiment, the security system 300 includes a voice-processing unit 320, at least one sensor 310, a control unit 350, and at least one control device 360. Generally speaking, the voice recognition functions of system 300 and the alarm responses are similar to those of system 100 or 100A described earlier. Thus, the advantages of system 100 or 100A in relation to voice recognition may be readily integrated to traditional security systems.

In the embodiment of system 300, a plurality of sensors 310 is configured to detect at least two parameters, wherein one of the parameters is sound. The other parameters may be smoke, temperature, water, electromagnetic field, light, stress . . . etc. The number of sensors 310 may vary depending on the size of the space to be protected, the depth of the security needs, the type of the space, and the spectrum of sound frequencies to be covered in the security design of the space. A sensor 310 may be any type transducers or transmitters that are used to generate an electrical signal in response to changes in the parameter being monitored. In one embodiment, sensors 310 may be placed in different locations in the space to be protected. However, one or more of the sensors may also be placed outside the space to be protected and used to provide a reference signal.

In one embodiment, at least one sound sensor 310A is coupled to the voice-processing unit 320. The signal generated by the sound sensor 310A is delivered to unit 320 for processing. It should be noted that a copy signal from the sensor 310A may be provided to control unit 350 as well. In another embodiment, the sound sensor signal is provided to the voice-processing unit 320 through the control unit 350. The voice-processing unit 320 comprises a voice recognition unit 340, a voice list 330, and an emergency voice list 335. The voice recognition unit 340 may be any suitable voice recognition unit known to those skilled in the art. In one embodiment, the voice list 330 or the emergency voice list 335 is included within the voice recognition unit 340. Alternatively, the voice list 330 or the emergency voice list 335 may be included within the voice-processing unit 320, as an external element to the voice recognition unit 340. In one embodiment, system 300 includes either the voice list 330 or the emergency voice list 350. In the embodiment shown in FIG. 3, voice list 330 is adapted to store a plurality of voice patterns and the emergency voice list is adapted to store a plurality of special coded voice patterns or voice codes. The content of either the voice list 330 or the emergency voice list 335 includes at least one word pronounced by at least one user. The user is any human or non-human source of sound, in which the availability of the sound or the type of the sound generated by that source in the space to be protected indicate the presence of the sound in the space.

In one embodiment, the voice-processing unit 320 is configured to analyze at least one sound detected in the space to be protected. Analysis of the sound may include generating a current voice pattern. Upon the generation of the current voice, the voice-processing unit 320 compares the current voice pattern with the contents of the voice list and the emergency voice list. The result of the comparison between the current voice pattern and the content of the voice list 330 identifies a level of discrepancy, while between the current voice pattern and the content of the emergency voice list 335 identifies a level of matching. The level of discrepancy indicates the existence of an unauthorized presence in the space to be protected. The level of matching indicates the need to perform a specific security measure. The level of discrepancy or the level of matching that is determined by the voice-processing unit 320 is dependent on a size of the difference between the current voice pattern and the content of the voice list 330, or the size of the similarly between the current voice pattern and the content of the emergency voice list 335. It should be noted that several levels of sophistication for the voice recognition and processing functions of system 300 may be employed to suite different security needs.

In the embodiment of FIG. 3, the control unit 350 of system 300 is configured to receive signals from the sensors 310 and the voice-processing unit 320, and to supply at least one control signal to at least one of the control devices 360. The control unit 350 uses the received signal(s) (representing sound and other parameters) to generate a control action according to predetermined criteria. Thus, system 300 integrates functions provided by traditional security systems and the voice processing functions of the present invention. The number of control devices 360 may vary depending on the action measures that the system 300 is designed for. Further, a control device may be any device adapted to perform a function in response to a control signal received from the control unit 350. For example, a control device 360 may be an audio alarm, a visual alarm, an electrical door locker/opener, an electricity controller, a light controller, a phone system, a controller to dial a number through the phone system, a display device . . . etc. In one embodiment, the control unit 350 is configured to perform a sequence of actions upon one or more signals received from the voice-processing unit 320 and the sensors 310. In another embodiment, the sequence of actions performed by the control unit 350 depends on signals supplied by the voice-processing unit 320 and at least one of the sensors 360. It will be appreciated to those skilled in the art having the advantages of this disclosure that many combinations of the control devices 360 and configurations of the control unit 350 are possible.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:

1. A method for determining an unauthorized presence in a space to be protected comprising:

storing a voice list, wherein said voice list includes a plurality of voice patterns;

detecting a sound in said space, wherein said sound is indicative of a presence of at least one source of said sound in said space;

generating a current voice pattern from said sound;

comparing said current voice pattern with at least one of said plurality of voice patterns in said voice list to determined if said presence in said space is said unauthorized presence; and initiating an alarm response if said presence in said space is said unauthorized presences;

wherein said plurality of voice patterns are generated from sounds of one or more authorized users and sounds from one or more non-human sources.

2. The method as recited in claim 1 wherein said generating said current voice pattern from said sound includes using voice recognition to analyze said sound.

3. The method as recited in claim 2 wherein said comparing includes using said voice recognition to determine a first level of discrepancy between said current voice pattern and a content of said voice list, wherein said first level of discrepancy is determined based on first predetermined criteria.

4. The method as recited in claim 3 wherein said first level of discrepancy is used to determined if said presence in said space is said unauthorized presence based on said first predetermined criteria.

5. The method as recited in claim 1 wherein said alarm response includes at least one action of a plurality of actions, wherein said action includes activating at least one device from a plurality of devices, and wherein if at least two actions of said plurality of actions are executed, said at least two actions are executed in a first sequence from a plurality of sequences based on second predetermined criteria.

6. The method as recited in claim 5, further comprising storing an emergency voice code list, wherein said emergency voice code list includes a plurality of voice codes, wherein said plurality of voice codes are generated by said sounds of said one or more authorized users and sounds from said one or more non-human sources, wherein if said current voice pattern corresponds to one of said plurality of voice codes in said emergency voice code list, at least one predetermined action of said plurality of actions is initiated.

7. A system for providing security to a space by detecting an unauthorized presence in said space, the system comprising:

a first sensor configured to detect a sound in said space, wherein said sound is indicative of at least one source of said sound in said space, and wherein said source is indicative of a presence in said space;

a voice-processing unit coupled to said first sensor and configured to store a voice list, wherein said voice list includes a plurality of voice patterns, analyze said sound in said space, generate a current voice pattern from said sound detected by said first sensor, compare said current voice pattern with at least one of said plurality of voice patterns in said voice list to determined if said presence in said space is said unauthorized presence; and a control unit coupled to said voice-processing unit and said first sensor and configured to initiate an alarm response if said presence in said space is said unauthorized presence;

wherein said plurality of voice patterns are generated from sounds of one or more authorized users and sounds from one or more non-human sources.

8. The system as recited in claim 7 further comprises a first control device from a plurality of devices coupled to said control unit, wherein said first control device is used to perform a first control function.

9. The system as recited in claim 8 wherein said alarm response initiated by said control unit includes at least one action of a plurality of actions, wherein said action includes activating said at least one of said plurality of devices.

10. The system as recited in claim 9 wherein said control unit is further configured to execute at least two actions of said plurality of actions in a first sequence from a plurality of sequences based on second predetermined criteria.

11. The system as recited in claim 9 wherein said voice-processing unit is further configured to store an emergency voice code list, wherein said emergency voice code list includes a plurality of voice codes, wherein said plurality of voice codes are generated by said sounds of said one or more authorized users and sounds from said one or more non-human sources.

12. The system as recited in claim 11 wherein if said voice-processing unit determines that said current voice pattern corresponds to one of said plurality of voice codes in said emergency voice code list, said control unit initiates at least one predetermined action from said plurality of actions.

13. The system as recited in claim 7 wherein said voice-processing unit generates said plurality of voice patterns by recording said sounds of said one or more authorized users and sounds from said one or more non-human sources.

14. The system as recited in claim 7 wherein said voice-processing unit uses voice recognition to recognize said sound, generate said current voice pattern from said sound, and compare said current voice pattern with a content of said voice list.

15. The system as recited in claim 14 wherein said voice-processing unit comparing said current voice pattern with at least one of said plurality of voice patterns in said voice list to determine if said presence in said space is said unauthorized presence includes using a first level of discrepancy between said current voice pattern and said content of said voice list, wherein said first level of discrepancy is based on first predetermined criteria, and wherein said first level of discrepancy is used to determine if said presence in said space is said unauthorized presence based on said first predetermined criteria.

16. The system as recited in claim 7, further comprising a second sensor configured to detect a parameter other than said sound, wherein said second sensor is coupled to said control unit, wherein said control unit is further configured to use an output of said second sensor to initiate a control action based on third predetermined criteria.

* * * * *

US006263311C1

(12) EX PARTE REEXAMINATION CERTIFICATE (9659th)
United States Patent
Dildy (10) Number: US 6,263,311 C1
(45) Certificate Issued: May 16, 2013

(54) METHOD AND SYSTEM FOR PROVIDING SECURITY USING VOICE RECOGNITION (75) Inventor: Robert Dildy, Austin, TX (US)

(73) Assignee: Intellectual Ventures I LLC, Wilmington, DE (US)

Reexamination Request:
No. 90/012,216, Mar. 30, 2012

Reexamination Certificate for:
Patent No.: 6,263,311
Issued: Jul. 17, 2001
Appl. No.: 09/228,475
Filed: Jan. 11, 1999

(51) Int. Cl.
G10L 17/00 (2006.01)

(52) U.S. Cl.
USPC .................... 704/273; 704/247; 704/E17.003

(58) Field of Classification Search
None
See application file for complete search history.

(56) References Cited

To view the complete listing of prior art documents cited during the proceeding for Reexamination Control Number 90/012,216, please refer to the USPTO's public Patent Application Information Retrieval (PAIR) system under the Display References tab.

*Primary Examiner* — Minh Dieu Nguyen (57) ABSTRACT

Method and system for providing security to a space by detecting an unauthorized presence in the space using voice recognition. A plurality of acceptable voice patterns is generated from sounds of authorized users and stored in the security system. Sounds in the space to be protected are detected and a current voice pattern is generated from at least one sound detected in the space to be protected. The current voice pattern is compared with entries in the stored voice lists to determine a level of difference or a level of similarity between the current voice pattern and the content of the voice list. If the determined level constitutes a discrepancy according to predetermined criteria, an alarm response is initiated. Further, if the determined level constitutes a matching between the current voice pattern and an entry in an emergency list of voice codes that were entered by authorized users, a predetermined emergency action is performed. The advantages of the voice recognition as a security measure may be also integrated into existing security systems.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-16 is confirmed.

New claims 17-26 are added and determined to be patentable.

*17. The method as recited in claim 1 wherein said plurality of voice patterns are generated from a single sound or a combination of sounds of one or more authorized users and a single sound or a combination of sounds from one or more authorized non-human sources.*

*18. The method as recited in claim 1 wherein said generating said current voice pattern is triggered upon receiving a signal in response to said detecting said sound in said space.*

*19. The method as recited in claim 1 wherein said initiating said alarm response further comprises:*
  *performing a first sequence of actions upon receiving first assertion signals; and*
  *performing a second sequence of actions upon receiving second assertion signals.*

*20. The method as recited in claim 19 wherein said first assertion signals are generated upon detecting a first level of discrepancy between said current voice pattern and at least one of said plurality of voice patterns in said voice list, and wherein said second assertion signals are generated upon detecting a second level of discrepancy between said current voice pattern and at least one of said plurality of voice patterns in said voice list.*

*21. The method as recited in claim 6 wherein said comparing further comprises:*
  *determining said unauthorized presence in said space upon detecting a level of discrepancy between said current voice pattern and at least one of said plurality of voice patterns in said voice list; and*
  *determining at least one predetermined action to initiate upon detecting a level of matching between said current voice pattern and at least one of said plurality of voice codes in said emergency voice code list.*

*22. The system as recited in claim 7 wherein said voice-processing unit is configured to store said plurality of voice patterns generated from a single sound or a combination of sounds of one or more authorized users and a single sound or a combination of sounds from one or more authorized non-human sources.*

*23. The system as recited in claim 7 wherein said voice-processing unit is configured to generate said current voice pattern upon receiving a signal from said first sensor indicating detection of said sound in said space.*

*24. The system as recited in claim 7 wherein said control unit is further configured to initiate said alarm response to perform a first sequence of actions upon receiving first assertion signals from said voice-processing unit and perform a second sequence of actions upon receiving second assertion signals from said voice-processing unit.*

*25. The system as recited in claim 24 wherein said voice-processing unit is configured to generate said first assertion signals upon detecting a first level of discrepancy between said current voice pattern and at least one of said plurality of voice patterns in said voice list, and generate said second assertion signals upon detecting a second level of discrepancy between said current voice pattern and at least one of said plurality of voice patterns in said voice list.*

*26. The system as recited in claim 12 wherein said voice-processing unit is further configured to:*
  *determine said unauthorized presence in said space upon detecting a level of discrepancy between said current voice pattern and at least one of said plurality of voice patterns in said voice list; and*
  *determine at least one predetermined action to initiate upon detecting a level of matching between said current voice pattern and at least one of said plurality of voice codes in said emergency voice code list.*

\* \* \* \* \*